US006917500B2

(12) United States Patent
Vail et al.

(10) Patent No.: US 6,917,500 B2
(45) Date of Patent: Jul. 12, 2005

(54) HYBRID RELAY INCLUDING SOLID-STATE OUTPUT AND HAVING NON-VOLATILE STATE-RETENTION AND ASSOCIATED METHODS

(75) Inventors: David Kenyon Vail, West Melbourne, FL (US); W. Ken Martindale, Malabar, FL (US); Stephen S. Wilson, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 79 days.

(21) Appl. No.: 10/118,272

(22) Filed: Apr. 8, 2002

(65) Prior Publication Data

US 2003/0198002 A1 Oct. 23, 2003

(51) Int. Cl.[7] .................................................. H02H 3/00

(52) U.S. Cl. ................................................ 361/2; 361/7

(58) Field of Search ................................ 361/2, 3, 7, 8, 361/13, 166, 190, 191; 307/126, 140; 335/87, 179

(56) References Cited

U.S. PATENT DOCUMENTS

| | | | | |
|---|---|---|---|---|
| 3,982,137 A | * | 9/1976 | Penrod | 361/8 |
| 4,420,784 A | * | 12/1983 | Chen et al. | 361/7 |
| 4,463,401 A | * | 7/1984 | Grenier et al. | 361/72 |
| 4,531,172 A | * | 7/1985 | Mertz | 361/13 |
| 4,772,809 A | * | 9/1988 | Koga et al. | 307/140 |
| 5,053,907 A | | 10/1991 | Nishi et al. | 361/9 |
| 5,633,540 A | * | 5/1997 | Moan | 307/126 |
| 5,699,218 A | | 12/1997 | Kadah | 361/13 |
| 6,078,491 A | | 6/2000 | Kern et al. | 361/167 |
| 6,518,764 B2 | * | 2/2003 | Shirato | 324/413 |

* cited by examiner

*Primary Examiner*—Brian Sircus
*Assistant Examiner*—Danny Nguyen
(74) *Attorney, Agent, or Firm*—Allen, Dyer, Doppelt, Milbrath & Gilchrist, P.A.

(57) ABSTRACT

The hybrid relay may include a plurality of input and output terminals, and a voltage supply terminal. The hybrid relay may also include an electromagnetic coil connected to the input terminals and a latching mechanism that may include first and second contacts movable between open and closed latched positions based upon the electromagnetic coil. The first contact may be connected to the voltage supply terminal so that the second contact provides a switched voltage supply. The hybrid relay may also include an output transistor having a control terminal and having conduction terminals connected to the output terminals of the hybrid relay. A transistor driver may be connected between the switched voltage supply and the control terminal of the output transistor.

34 Claims, 3 Drawing Sheets

HYBRID RELAY INCLUDING SOLID-STATE OUTPUT AND HAVING NON-VOLATILE STATE-RETENTION AND ASSOCIATED METHODS

FIELD OF THE INVENTION

The present invention relates to the field of electronics, and more particularly, to a hybrid relay and associated methods.

BACKGROUND OF THE INVENTION

Purely electromechanical relays are often used so that a relatively low power control signal can be used to control a higher power signal. An electromagnetic coil is energized by the control signal to cause an armature to change position. The armature may carry one or more movable contacts. A frame carries one or more corresponding fixed contacts. Accordingly, pairs of contacts serve as switches to control the higher power signal based upon movement of the armature relative to the frame.

Solid-state relays are also available to perform a similar isolation function. A solid-state relay may include a driver circuit and a field-effect transistor (FET) providing the output signal and having a control terminal or gate connected to the driver circuit. The driver circuit receives the control signal and operates or drives the output FET based upon the control signal.

One disadvantage of a solid-state relay is that it typically does not have non-volatile memory to retain its on/off state when power is discontinued. In addition, a solid-state relay also typically requires a continuous on/off control signal, and is, therefore, not compatible with a typical spacecraft interface, for example, that uses 28-volt pulses for on/off signals.

A mechanical latching relay could provide state-retention even when power is removed. Unfortunately, a typical medium/high current space-qualified mechanical latching relay is physically large, and not amenable to use in high-density circuit board applications.

In addition, typical space applications avoid a mechanical latching relay due to concern for wearing out of the contacts when large currents are being switched. To overcome this drawback, a circuit can be implemented where the switching is not done under load, that is, where cold switching is designed into the circuit. This can complicate circuit design and potentially affect reliability.

Some hybrid electromechanical/solid-state relays have been developed including a solid-state power switching device connected across the output contacts of the relay to reduce the switching load on the contacts, as disclosed, for example, in U.S. Pat. No. 6,078,491 to Kern et al. and U.S. Pat No. 5,699,218 to Kadah. U.S. Pat. No. 5,053,907 to Nishi et al. discloses sequential operation of three sets of contacts along with power devices to reduce arcing and resultant damage that may otherwise occur. These approaches may still be unsuitable for certain applications, particularly, spaceborne applications and where non-volatile state retention is required.

SUMMARY OF THE INVENTION

In view of the foregoing background, it is therefore an object of the present invention to provide a hybrid relay having non-volatile state retention and which may be suitable for spacecraft applications, for example.

This and other objects, features and advantages in accordance with the present invention are provided by a hybrid relay including at least one electromagnetic coil connected to input terminals, and a latching mechanism comprising first and second contacts movable between open and closed latched positions based upon the at least one electromagnetic coil. The first contact may be connected to the voltage supply terminal so that the second contact provides a switched voltage supply. The hybrid relay may further include an output transistor having a control terminal, and having conduction terminals connected to output terminals. In addition, a transistor driver may be connected between the switched voltage supply and the control terminal of the output transistor. Accordingly, the relatively small control signal is selectively applied to the electromagnetic coil to control the switched voltage supply contact, which, in turn, ultimately controls the output transistor.

The output transistor may be a high power FET which can control relatively large currents which would otherwise damage or shorten the life of the relay contacts. In other words, the arrangement of the latching relay and solid-state output device provides isolation between the input terminals and output thereof. In addition, the latching mechanism provides the non-volatile state retention for the hybrid relay so that even if power is removed or lost, when power is restored, the relay will still remain in its desired previous state. The latching mechanism also permits pulsed control signals to operate the hybrid relay.

The hybrid relay may also include third and fourth contacts movable between open and closed latch positions. These third and fourth contacts can be used to provide telemetry that the relay is in the desired state. These or additional contacts can also be used to perform other switching tasks, for example.

The latching mechanism may include a frame fixed relative to the at least one electromagnetic coil and carrying a fixed one of the first and second contacts. The latching mechanism may also include a movable latching armature carried by the frame and carrying a movable one of the first and second contacts.

In one convenient class of embodiments, the hybrid relay may further include a housing surrounding the at least one electromagnetic coil and the latching mechanism, as well as the output transistor and the transistor driver. Since the output transistor switches the higher power signal, the relay coil and contacts may be made relatively small. Accordingly, the hybrid relay may have a relatively small footprint, and, therefore, be advantageous for high density circuit arrangements.

Another aspect of the invention is directed to a method for providing non-volatile state-retention and also isolation between a control signal and an output signal. The method may comprise defining a switched voltage supply using first and second contacts of an electromechanical relay which are relatively movable based upon the control signal being delivered to at least one electromagnetic coil of the electromechanical latching relay, and using the switched voltage supply to operate a solid-state output stage for generating the output signal.

Defining the switched voltage supply may comprise coupling the first contact to a voltage supply so that the second contact provides the switched voltage supply. The control signal may comprise an input pulse signal. In addition, the solid-state output stage may include an output transistor, such as an FET, and a transistor driver connected thereto. The output transistor may switch a relatively higher power than the power of the input pulse signal. The method may also include providing relay telemetry using third and fourth contacts of the electromechanical latching relay.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
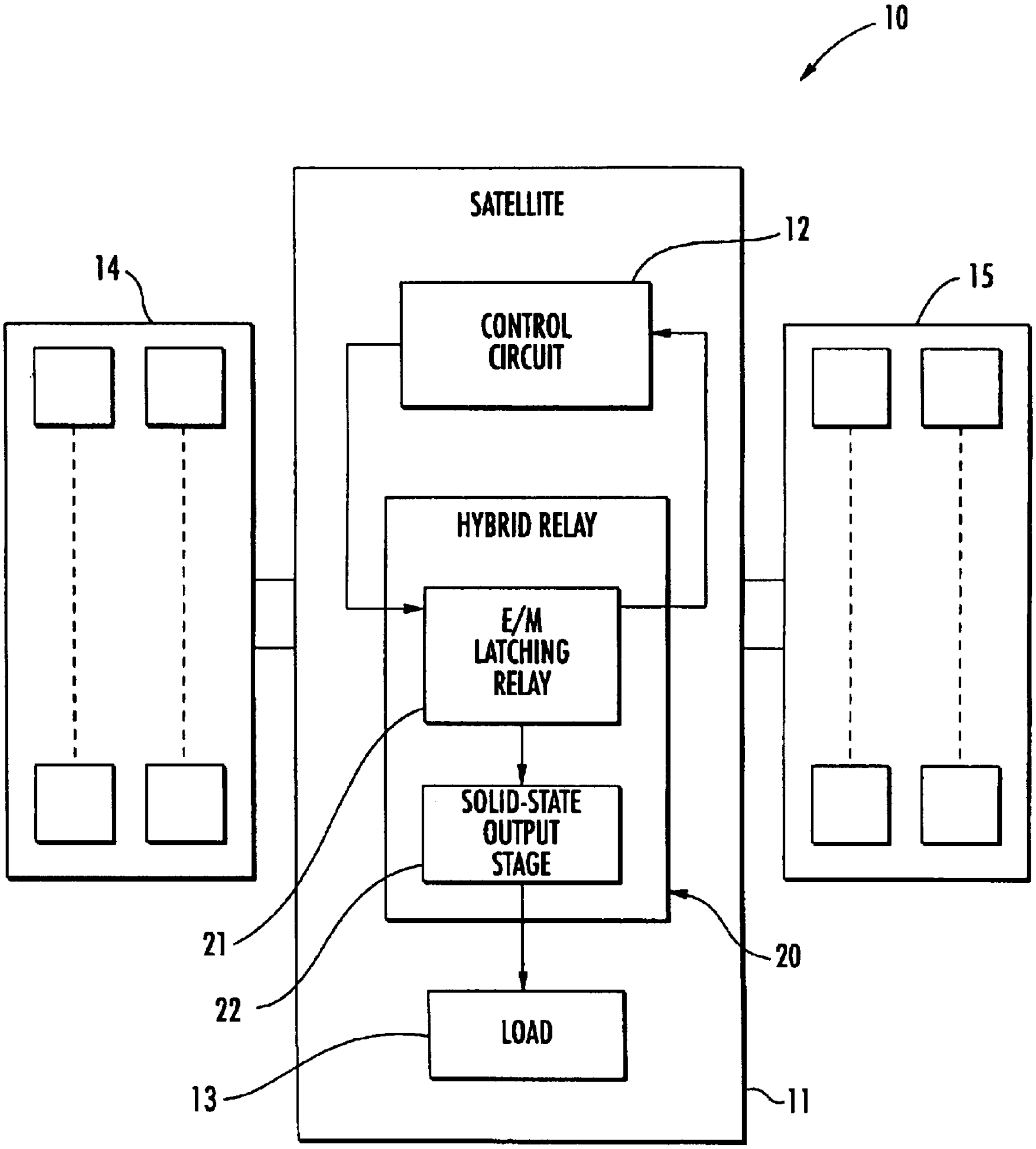
FIG. 1 is a schematic diagram of a spacecraft including the hybrid relay in accordance with the present invention.

Referring initially to FIG. 1, the hybrid relay 20 in accordance with the present invention is first described. The hybrid relay 20 may be especially advantageous for space-borne applications, and may be included within circuitry of a spacecraft, such as a satellite 10, as shown in FIG. 1. The satellite 10 illustratively includes a main housing 11, which carries outboard solar panels 14, 15. In addition, the main housing 11 also includes the schematically illustrated control circuit 12 which is coupled to the hybrid relay 20 which, in turn, is used to control or supply power to the load 13. The hybrid relay 20 includes an electromechanical (E/M) latching relay 21 and a solid-state output stage 22 connected thereto.

Those of skill in the art will also recognize the hybrid relay 20 can be used to control many different types of loads, especially where isolation and non-volatile state retention are desired. Of course, those of skill in the art will also recognize that the hybrid relay 20 may be advantageously used in other non-space related settings.

Figure 2:
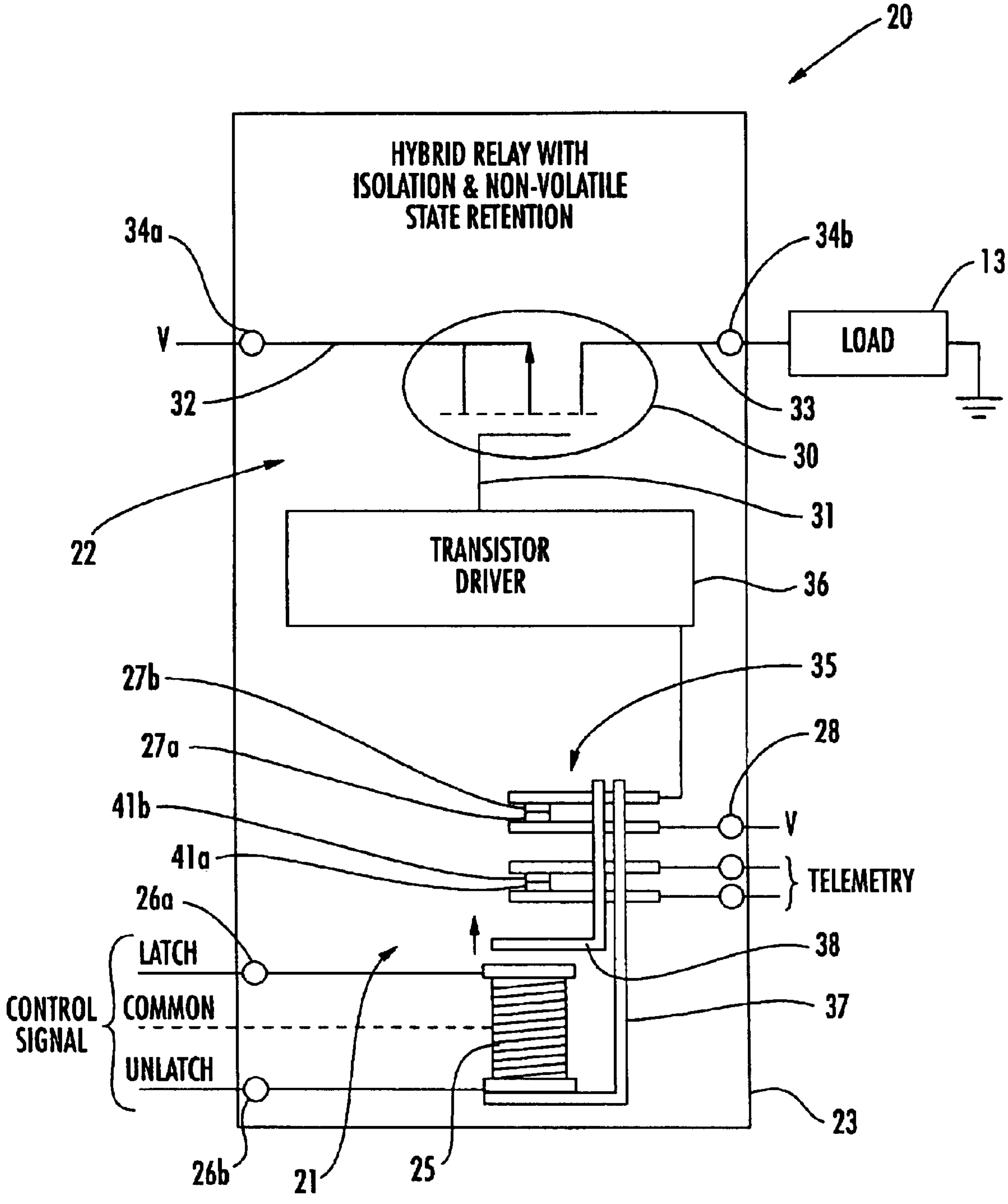
FIG. 2 is more detailed schematic view of the hybrid relay as shown in FIG. 1.

Referring now additionally to FIG. 2, the hybrid relay 20 is further described. The hybrid relay 20 includes a housing 23 which illustratively carries both the E/M latching relay 21, as well as the solid-state output stage 22. The E/M relay 21 illustratively includes an electromagnetic coil 25 which is connected to two input terminals 26*a*, 26*b*. Of course, it will be appreciated by those skilled in the art that in some embodiments two electromagnetic coils may be connected each to respective latching and unlatching terminals, for example. The E/M relay 21 also includes a latching mechanism 35 comprising first and second contacts 27*a*, 27*b* movable between open and closed latched positions based upon energization of the electromagnetic coil 25 The first contact 27*a* is illustratively connected to a voltage supply terminal 28 so that the second contact 27*b* provides the switched voltage supply.

The hybrid relay 20 also includes an output transistor in the illustrated form of the output FET 30 having a gate, or control terminal, 31 the output FET 30 also has source and drain terminals, or conduction terminals, 32, 33 connected to respective output terminals 34*a*, 34*b*. A first output terminal 34*a* is illustratively connected to a voltage supply while the second terminal 34*b* is connected to the load, although those of skill in the art will appreciate that the connections may be reversed in other embodiments. Further, it will also be appreciated that different voltage supplies may be connected to the first output terminal 34*a* and the voltage supply terminal 28 in some embodiments. Those of skill in the art will recognize that a bipolar transistor or other semiconductor switching device may be used with or instead of the output FET 30. In addition, the output FET 30 may be formed by a plurality of parallel-connected FETs in integrated circuit form.

A transistor driver 36 is connected between the switched voltage supply and the control terminal 31 of the output FET 30. The transistor driver 36 and output FET 30 represent an exemplary embodiment of the solid-state output stage 22. In other embodiments, the transistor driver circuit 36 may not be needed or require very few components (e.g., a resistor-capacitor circuit) In addition, semiconductor output switching devices other than an FET (e.g., bi-polar, IBGT) can also be used as will be appreciated by those skilled in the art.

The relatively small control signal may be selectively applied to the electromagnetic coil 25 to control the switched voltage supply contact 27*b*, which, in turn, operates the transistor driver 36, and which, in turn, controls the output FET 30. The output FET 30 may be a high power device which can control relatively large currents which would otherwise damage or shorten the life of the relay contacts 27*a*, 27*b*. This arrangement of the E/M latching relay 21 and solid-state output stage 22 provide isolation between the input and output. Another advantage of the solid state output stage 22 is that the turn-on and turn-off times can be controlled, avoiding fast transients that could damage the load.

The latching mechanism 35 illustratively includes a frame 37 fixed relative to the electromagnetic coil and carrying the first contact 27*a*. The latching mechanism 35 may also include a movable latching armature 38 carried by the frame and carrying the second contact 27*b*. The detailed construction and operation of such a latching mechanism 35 will be readily appreciated by those skilled in the art without requiring further discussion herein. A typical configuration may move the latching armature 38 between open and closed positions based upon control signals of first and second polarities supplied to the coil 25. In other embodiments a second coil, not shown, could be provided to move the latching armature 38. Those of skill in the art will appreciate yet other possible configurations as contemplated by the present invention.

The latching mechanism 35 provides the non-volatile state retention for the hybrid relay 20 so that even if power is removed or lost, when power is restored, the relay will still remain in its desired prior state. The latching mechanism 35 also permits pulsed control signals to operate the hybrid relay 20 as will be appreciated by those skilled in the art. For example, in spacecraft applications, 28 volt pulses are typically used as control pulses and the hybrid relay 20 in accordance with the invention may readily accommodate these or other types of control signals.

The hybrid relay 20 also illustratively includes third and fourth contacts 41*a*, 41*b* movable between open and closed latch positions. These third and fourth contacts 41*a*, 41*b* can be used to provide telemetry that the hybrid relay 20 is in the desired state. These or additional contacts can also be used to perform other switching tasks, for example, as will also be appreciated by those skilled in the art.

In the illustrated embodiment of the hybrid relay 20 the housing 23 surrounds the E/M latching relay 21, including the electromagnetic coil 25 and the latching mechanism 35, as well as the solid-state output stage 22, including the output FET 30 and the transistor driver 36. Since the output FET 30 switches the higher power signal, the relay coil 25 and contacts 27*a*, 27*b* may be made relatively small. It then follows that the hybrid relay 20 may have a relatively small footprint and thus be advantageous for high density circuit arrangements.

Figure 3:
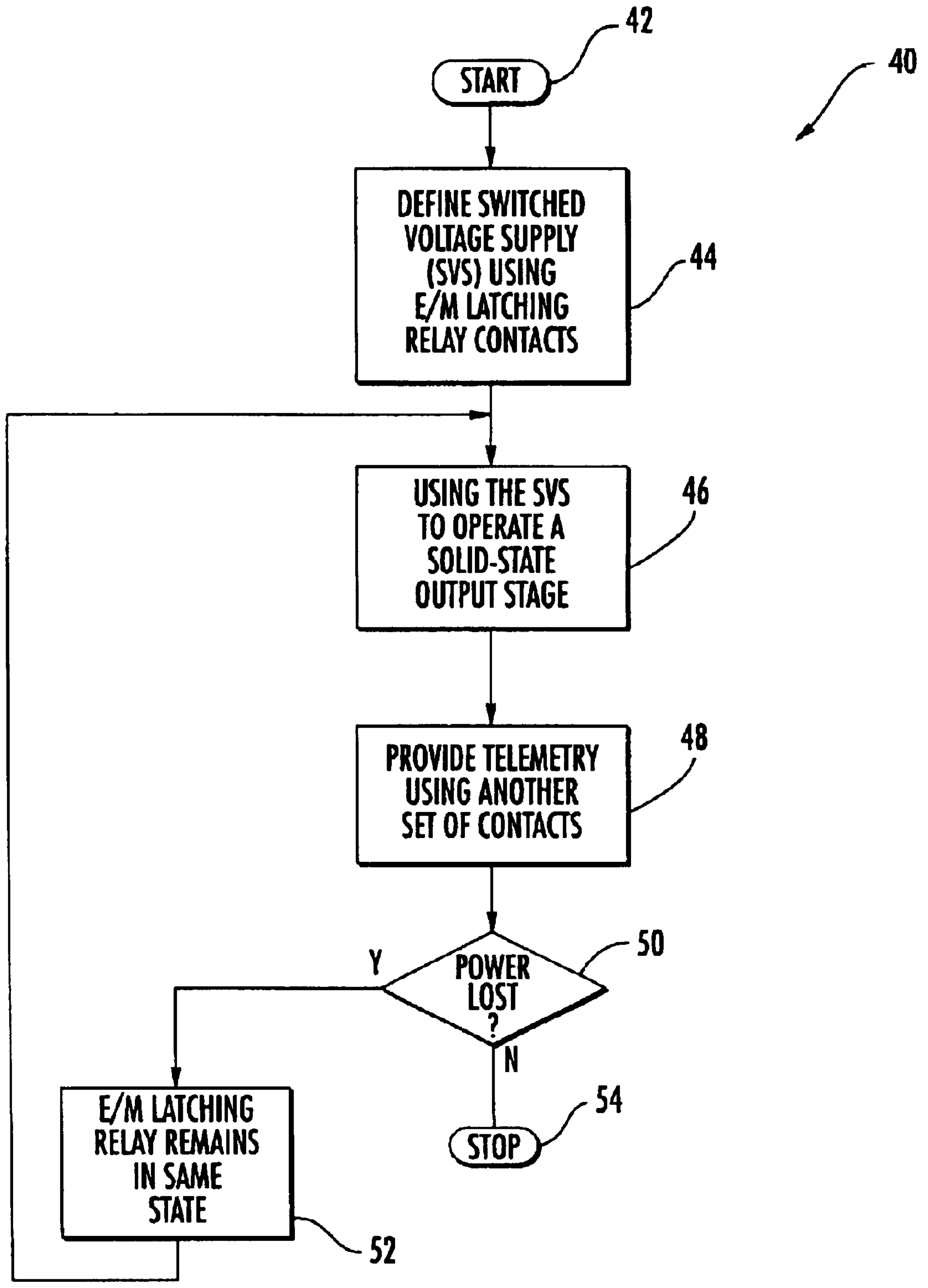
FIG. 3 is a flow chart illustrating steps of a method in accordance with the present invention.

Turning now additionally to the flow chart 40 of FIG. 3, another aspect of the invention is directed to a method for providing non-volatile state-retention and also isolation between a control signal and an output signal. From the start (Block 42), the method may comprise at Block 44 defining a switched voltage supply using first and second contacts 27*a*, 27*b* of an E/M latching relay 21 which are relatively movable based upon the control signal being delivered to an electromagnetic coil 25. Defining the switched voltage supply may comprise coupling the first contact 27*a* to a voltage supply so that the second contact 27*b* provides the switched voltage supply.

At Block 46 the method may also include using the switched voltage supply to operate a solid-state output stage 22 for generating the output signal. The control signal may be an input pulse signal, and the solid-state output stage 22 may include an output transistor, such as an FET 30, and a transistor driver 36 connected thereto. The output transistor or FET 30 may switch a relatively higher power than a power of the input pulse signal. At Block 48 telemetry may also be provided by using third and fourth contacts of the E/M relay 21.

At Block 50 if power is lost, the E/M latching relay 21 will retain its previous state. Accordingly, the output from the solid-state output stage 22 will also be in the previous state when power is restored, before stopping at Block 54.

Thus, in accordance with the present invention, the need for large, heavy, and expensive relays which would otherwise be required in accordance with the prior art to provide high current and contact resistance may advantageously be avoided. Furthermore, use of the FET 30 also provides low contact resistance, as will be appreciated by those of skill in the art.

Many modifications and other embodiments of the invention will come to the mind of one skilled in the art having the benefit of the teaching presented in the foregoing descriptions and the associated drawings. Therefore, it is understood that the invention is not to be limited to the specific embodiments disclosed, and that other modifications and embodiments are intended to be included within the scope of the appended claims.

What is claimed is:

1. A hybrid relay comprising:

a plurality of input and output terminals, and a voltage supply terminal;

at least one electromagnetic coil connected to said input terminals;

a latching mechanism comprising first and second contacts movable between open and closed latched positions based upon said at least one electromagnetic coil, the first contact connected to the voltage supply terminal so that the second contact provides a switched voltage supply;

an output transistor having a control terminal and having conduction terminals connected to said output terminals; and a transistor driver connected between the switched voltage supply and the control terminal of said output transistor.

2. A hybrid relay according to claim 1 wherein said first and second contacts of said latching mechanism are switchable based upon an input pulse signal on said input terminals.

3. A hybrid relay according to claim 2 wherein said output transistor switches a relatively higher power than a power of the input pulse signal.

4. A hybrid relay according to claim 1 wherein said output transistor comprises at least one field-effect transistor (FET).

5. A hybrid relay according to claim 1 wherein said latching mechanism further comprises third and fourth contacts movable between open and closed latch positions to thereby provide relay telemetry.

6. A hybrid relay according to claim 1 wherein said latching mechanism further comprises a frame fixed relative to said at least one electromagnetic coil and carrying a fixed one of said first and second contacts.

7. A hybrid relay according to claim 6 wherein said latching mechanism further comprises a movable latching armature carried by said frame and carrying a movable one of said first and second contacts.

8. A hybrid relay according to claim 1 further comprising a housing surrounding said at least one electromagnetic coil and said latching mechanism.

9. A hybrid relay according to claim 8 wherein said housing further surrounds said output transistor and said transistor driver.

10. A hybrid relay comprising:

a plurality of input and output terminals, and a voltage supply terminal;

at least one electromagnetic coil connected to said input terminals;

a latching mechanism comprising first and second contacts movable between open and closed latched positions based upon said at least one electromagnetic coil, the first contact connected to the voltage supply terminal so that the second contact provides a switched voltage supply, and third an fourth contacts movable between open and closed latched positions based upon said at least one electromagnetic coil for providing relay telemetry;

an output field-effect transistor (FET) having a gate terminal, and having source and drain terminals connected to said output terminals; and a transistor driver connected between the switched voltage supply and the gate terminal of said output FET transistor.

11. A hybrid relay according to claim 10 wherein said first and second contacts and said third and fourth contacts of said latching mechanism are switchable based upon an input pulse signal on said input terminals.

12. A hybrid relay according to claim 11 wherein said output FET transistor switches a relatively higher power than a power of the input pulse signal.

13. A hybrid relay according to claim 10 wherein said latching mechanism comprises a frame fixed relative to said at least one electromagnetic coil and carrying a fixed one of said first and second contacts and a fixed one of said third and fourth contacts.

14. A hybrid relay according to claim 13 wherein said latching mechanism further comprises a movable latching armature carried by said frame and carrying a movable one of said first and second contacts and a movable one of said third and fourth contacts.

15. A hybrid relay according to claim 10 further comprising a housing surrounding said at least one electromagnetic coil and said latching mechanism.

16. A hybrid relay according to claim 15 wherein said housing further surrounds said output FET and said transistor driver.

17. An electronic circuit for spacecraft applications and comprising:

a control circuit and a load to be switched based upon said control circuit;

at least one electromagnetic coil connected to said control circuit;

a latching mechanism comprising a plurality of contacts movable between open and closed latched positions based upon said at least one electromagnetic coil;

an output transistor having a control terminal, and having conduction terminals connected to said load; and a transistor driver connected between at least one of said contacts and the control terminal of said output transistor.

18. An electronic circuit according to claim 17 wherein said control circuit generates an input pulse signal.

19. An electronic circuit according to claim 18 wherein said output transistor switches a relatively higher power than a power of the input pulse signal.

20. An electronic circuit according to claim 17 wherein said output transistor comprises at least one field-effect transistor (FET).

21. An electronic circuit according to claim 20 where said plurality of contacts comprise first and second contacts with the first contact to be connected to a voltage supply so that the second contact defines a switched voltage supply for said transistor driver.

22. An electronic circuit according to claim 21 wherein said plurality of contacts further comprises third and fourth contacts movable between open and closed latch positions to thereby provide relay telemetry.

23. An electronic circuit according to claim 17 further comprising a housing surrounding said at least one electromagnetic coil and said latching mechanism.

24. A hybrid relay comprising:

a plurality of input and output terminals, and a voltage supply terminal;

at least one electromagnetic coil connected to said input terminals;

a latching mechanism comprising first and second contacts movable between open and closed latched positions based upon said at least one electromagnetic coil, the first contact connected to the voltage supply terminal so that the second contact provides a switched voltage supply; and a solid-state output stage having a control input driven by the switched voltage supply, and having an output connected to said output terminals.

25. A hybrid relay according to claim 24 wherein said first and second contacts of said latching mechanism are switchable based upon an input pulse signal on said input terminals.

26. A hybrid relay according to claim 25 wherein said solid-state output stage switches a relatively higher power than a power of the input pulse signal.

27. A hybrid relay according to claim 24 wherein said solid-state output stage comprises at least one field-effect transistor (FET).

28. A hybrid relay according to claim 24 further comprising third and fourth contacts movable between open and closed latch positions to thereby provide relay telemetry.

29. A method for providing non-volatile state-retention and also isolation between a control signal and an output signal, the method comprising:

defining a switched voltage supply using first and second contacts of an electromechanical (E/M) latching relay which are relatively movable based upon the control signal being delivered to at least one electromagnetic coil of the E/M latching relay; and using the switched voltage supply to operate a solid-state output stage for generating the output signal.

30. A method according to claim 29 wherein defining the switched voltage supply comprises coupling the first contact to a voltage supply so that the second contact provides the switched voltage supply.

31. A method according to claim 29 wherein the control signal comprises an input pulse signal.

32. A method according to claim 31 wherein the solid-state output stage comprises an output transistor and a transistor driver connected thereto, and wherein the output transistor switches a relatively higher power than a power of the input pulse signal.

33. A method according to claim 32 wherein the output transistor comprises at least one field-effect transistor (FET).

34. A method according to claim 29 further comprising providing relay telemetry using third and fourth contacts of the electromechanical latching relay.

* * * * *